Feb. 9, 1926.
F. M. FORGESON
1,572,112
FLOUR SIFTER
Filed July 14, 1924
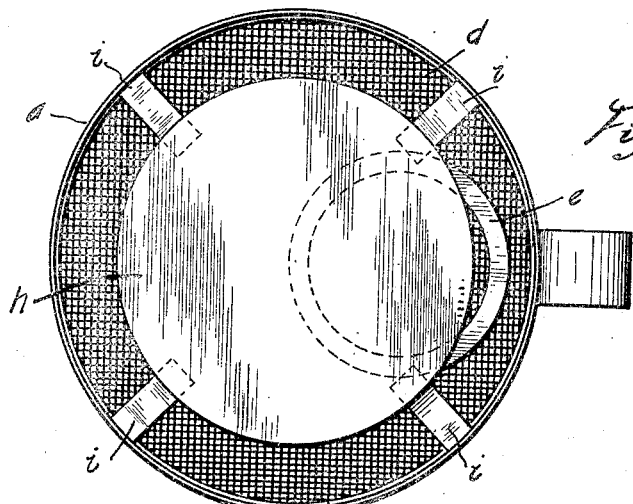
Fig. 2.
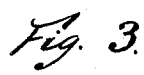
Fig. 3.
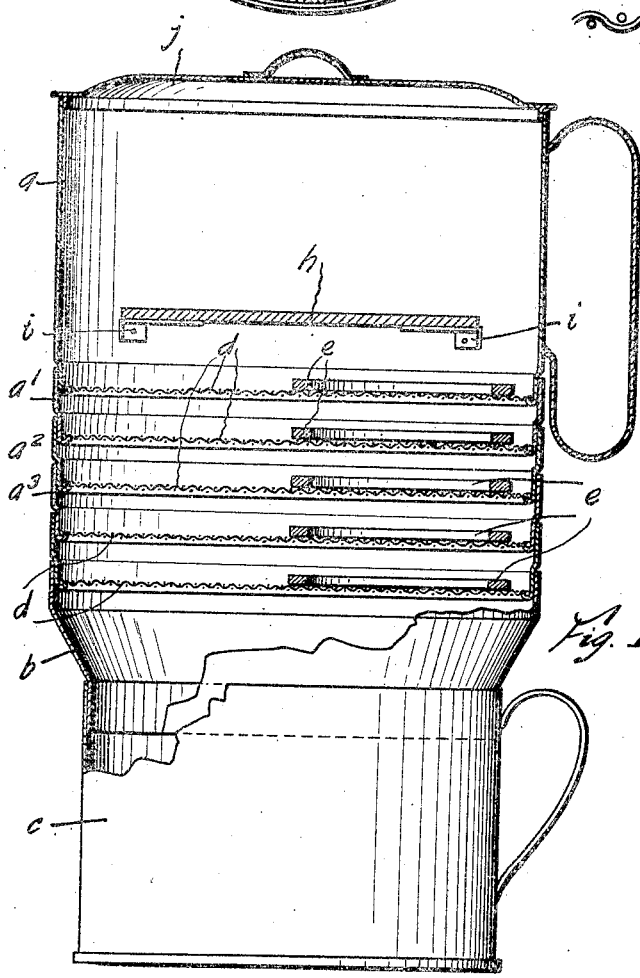
Fig. 1.
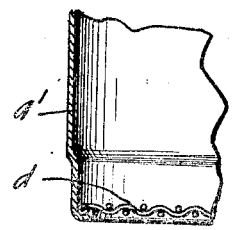
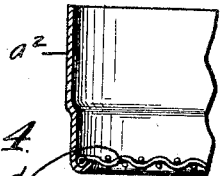
Fig. 4.
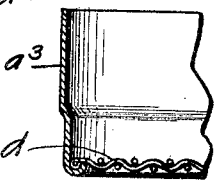
Inventor
Florence M. Forgeson
Attorney Patented Feb. 9, 1926.

1,572,112

UNITED STATES PATENT OFFICE.

FLORENCE M. FORGESON, OF PORTLAND, OREGON.

FLOUR SIFTER.

Application filed July 14, 1924. Serial No. 725,893.

*To all whom it may concern:*

Be it known that I, FLORENCE M. FORGESON, a citizen of the United States, and a resident of Portland, county of Multnomah, and State of Oregon, have invented a new and useful Improvement in Flour Sifters, of which the following is a specification.

It has heretofore been discovered that flour does not readily sift through the sieve, but tends to pack on the latter, more or less, unless an agitator be employed to loosen the flour, and thus keep the meshes of the sieve open.

To this end ring-like agitators have been employed in combination with the sieve— being laterally movable thereon, such movement being accompanied by the sidewise shaking of the sifter.

But I have discovered that if too much flour be deposited on the sieve the flour is apt to become packed about the agitator so solidly as to prevent the effective movement of the latter on the sieve, and thus the benefits of the agitator are to a large extent neutralized. I have further discovered that such undesirable result may be prevented by providing an imperforate shed above the agitator to limit the amount of flour deposited on the sieve, said shed being diametrically proportioned to cover a substantial part of said agitator and said sieve, thus deflecting the flour, spreading it over the sieve, and preventing it from packing to such extent on the latter as to restrain the movement and work of the agitator. And furthermore, the shed is so relatively spaced from said sieve, to permit the agitator limited free movement on the latter, at the same time operatively holding the agitator on the sieve during the shaking of the sifter.

A further object of my invention is to provide a flour sifter, embodying said main feature of my invention which is furthermore adapted to sift the flour to variable degrees of fineness as may be desired. Also to provide a flour sifter which may be readily cleaned. To this end the flour sifting portion of my flour sifter is preferably composed of a series of removably mounted sections, each comprising a sieve and a loose agitator co-operating therewith, in combination with which said shed functions.

I attain the primary object of my invention by providing a flour sifter comprising a body provided with a sieve, on which is placed a loose agitator, and covering a substantial portion of the latter with an imperforate shed of such diametric proportions and so spaced from the walls of the body of the sifter as to cover a substantial part of the sieve, at the same time permitting the flour to fall over the edge of the imperforate shed on the underlying sieve, and thus be so distributed on the latter as not to restrain the efficient movement of the agitator on the sieve.

The incidental features of my invention, and also the details of construction and mode of operation thereof are hereinafter fully described with reference to the accompanying drawings, in which:

Fig. 1 is a sectional elevation of a flour sifter embodying all features of my invention;

Fig. 2 is a top view of said flour sifter with the cover shown in Fig. 1 removed;

Fig. 3 is a diagrammatic illustration showing a section of the sieve on which rests an agitator; the sides and bottom faces of the latter being formed to make sharp angles with each other for the purpose hereinafter described; and Fig. 4 is a fragmentary section of said flour sifter illustrating that the flour sifting portion thereof is made of a series of removable sections.

My improved flour sifter comprises a sifting portion $a$ which I preferably made of a series of stacking sections as represented by the parts designated in Fig. 1, by $a'$, $a^2$, $a^3$ and $b$.

The lower piece $b$ constitutes a funnel-like piece which is removably mounted on the cup $c$.

Each of said sections $a'$, $a^2$, $a^3$ and $b$ I preferably construct as shown in Fig. 4, their bottom portions being contracted so that they may be removably stacked one upon the other.

Each of said sections is provided with a horizontally extended sieve $d$.

On each of the sieves $d$ is a loose agitator $e$. This agitator is of much smaller size in diameter than the diameter of the sifter portion $a$ so that the agitator may be freely moved laterally by the shaking of the sifter.

Over the uppermost sieve $d$, and the agitator $e$ lying thereon, I provide a shed $h$ the function of which is to cover a substantial portion of the uppermost agitator in any position in which it may be, and thus said shed will also overlie and cover a substantial portion of any of the sections comprised within the sifter portion of my sifter.

I find it convenient to make the shed *h* circular and of smaller diameter than the body of the sifting portion of my sifter so that the rim of the shed will be spaced all around from the wall of said body. The shed *h* is supported by means of radially arranged arms *i* as more clearly shown by Fig. 2.

Thus when flour is poured into the sifter the greater volume of the flour will be deposited on the shed *h*, and only that portion of the flour which passes over the rim of the shed *h* may drop on the underlying sieve *e*. Hence the latter cannot become so solidly packed with flour as to impede the lateral movement of the agitator *c* when the sifter is shaken during the sifting operation.

In order to facilitate the work of the agitator I prefer to make the latter of annular form with the bottom and side faces thereof formed to make sharp angles with each other. Thus I provide sharp corners at the bottom of the agitator, as at *k*, which have the tendency to more effectively scrape off, as it were, the flour deposited on the sieve, and in that way keep the latter in good operative condition.

I claim:

1. In a sifter of the character described, a receptacle provided with a transverse sieve, a ring-like agitator loose on said sieve, and in diameter adapted for lateral play between the walls of said receptacle on said sieve, and an imperforate shed fixed within the receptacle over the central portion of said sieve for the purpose described, said shed being relatively spaced from said sieve to permit the agitator limited free movement on the latter, at the same time operatively holding the agitator on the sieve during the shaking of the sifter, and said shed being diametrically proportioned to cover a substantial part of said agitator and sieve.

2. In a sifter of the character described, a receptacle provided with a transverse sieve, a ring-like agitator loose on said sieve, and in diameter adapted for lateral play between the walls of said receptacle on said sieve, and an imperforate shed fixed within the receptacle over said sieve, said shed being relatively spaced from said sieve to permit the agitator limited free movement on the latter, at the same time operatively holding the agitator on the sieve during the shaking of the sifter, and said shed being diametrically proportioned to cover a substantial part of said sieve and spaced from the sides of the receptacle to permit the flour to fall over the edge of the imperforate shed onto the underlying sieve so distributed as not to restrain the efficient movement of the agitator.

FLORENCE M. FORGESON.